United States Patent
Jaster et al.

[15] 3,678,376
[45] July 18, 1972

[54] ARRANGEMENT FOR TESTING BREAKDOWN OF THE INSULATION OF A CONDUCTOR UTILIZING AN ALTERNATING CURRENT CIRCUIT TO ELIMINATE STRAY CAPACITANCE EFFECTS

[72] Inventors: Dale R. Jaster, Northlake; James S. Nasby, Chicago, both of Ill.

[73] Assignee: GTE Automatic Electric Laboratories, Inc., Northlake, Ill.

[22] Filed: Dec. 14, 1970

[21] Appl. No.: 97,826

[52] U.S. Cl. ............................................................. 324/54
[51] Int. Cl. ........................................................ G01r 31/14
[58] Field of Search ............... 324/54, 118, 140, 123; 330/9, 330/10

[56] References Cited

UNITED STATES PATENTS

| | | | |
|---|---|---|---|
| 3,076,933 | 2/1963 | Negrete | 324/140 R |
| 3,497,830 | 2/1970 | Colton et al. | 330/9 X |
| 3,510,684 | 5/1970 | Martin | 330/9 X |
| 3,178,640 | 4/1965 | Jaster et al. | 324/54 |
| 3,286,130 | 11/1966 | Clinton | 324/54 X |

*Primary Examiner*—Gerard R. Strecker
*Attorney*—Cyril A. Krenzer, K. Mullerheim, B. E. Franz and Robert J. Black

[57] ABSTRACT

A circuit for testing breakdown conditions of insulation in networks or circuitry where substantial amounts of stray capacitance exist between the conductor under test and return paths such as ground. Measurement of real current flowing through the network under test permits high speed testing without concern for stray capacitance effects.

4 Claims, 2 Drawing Figures

INVENTORS
DALE R. JASTER
JAMES S. NASBY

AGENT

{ 3,678,376 }

ARRANGEMENT FOR TESTING BREAKDOWN OF THE INSULATION OF A CONDUCTOR UTILIZING AN ALTERNATING CURRENT CIRCUIT TO ELIMINATE STRAY CAPACITANCE EFFECTS

BACKGROUND OF THE INVENTION

1 Field of the Invention:

The present invention pertains to the detecting of an insulation breakdown in a conductor under test. More specifically the present invention is drawn to an alternating current breakdown detector that senses real current changes in a circuit under test, that includes substantial amounts of stray capacitance.

Insulation breakdown detectors like that disclosed herein are conventionally used in the testing of electronic and electrical circuitry during manufacturing processes, to determine that no defect exists in the insulating characteristics of circuit conductors or components employed therein. Conventionally insulation breakdown testing employs the application of either a high voltage direct current or alternating current. The advantage of using alternating current is that the insulation material under test is subjected to greater electrical stresses. However, it has been found that the stray capacitance existing between the conductor under test and a return path such as ground may be high enough to permit the ensuing alternate current flowing through it to result in a faulty indication of insulation breakdown.

2. Description of the Prior Art:

A previous alternating current breakdown detector capable of ignoring capacitance effects is disclosed in U.S. Pat. 3,178,640 issued to Dale R. Jaster and Stanley C. Ervin on April 13, 1965. This detector employs the "Ohmmeter" principle. In this arrangement a DC voltage is added to the normal AC test voltage and the detector samples the total current (both AC and DC). The detector then subtracts the AC signal from the total signal and amplifies the difference (the DC current). If the DC current is of sufficient magnitude it operates a relay or other indicator. In this arrangement the DC current flow is independent of any stray capacity of the network under test.

In another capacity ignoring AC breakdown detector, a DC voltage is applied to the AC test voltage and the detector circuitry samples the current flow. In this detector the total signal (AC and DC) is applied to one input of a stable high gain high common load rejection differential amplifier. The AC signal is coupled through a transformer to the other input of the differential amplifier. The differential amplifier then amplifies the difference which is the DC current. If the DC current which is independent of network capacitance, is greater than the reference current the amplifier output will be negative indicating a breakdown. In previous AC breakdown detectors, AC current is from 50 to several thousand times greater than the DC current flow, depending on the amount and capacity in the network. This arrangement makes detection of small DC currents difficult. Detectors like those previously outlined require long operating times (up to one second) to make a correct decision. Detectors like those described above also typically employ high gain DC amplifiers, and as such are subject to transients and require gating of the output to ignore such transients. The accuracy of these detectors is degraded by transients since they have a fairly long overload recovery time.

SUMMARY OF THE INVENTION

The AC breakdown detector disclosed herein overcomes the shortcomings of previous breakdown detectors by providing a detector whose accuracy is not affected by stray capacitance. It is a stable high sensitivity device allowing for the detection of low current breakdowns. Furthermore it is unaffected by switching transients resulting in highly accurate overall operation. The present design is operable at high speeds and may be adapted to various voltages and breakdown resistances. Furthermore the detector's limit reference is derived from the test voltage so that variations of the test voltage do not affect detector accuracy.

The present AC breakdown detector relies on the sensing of "in phase" current as opposed to sensing DC current. In the arrangement disclosed herein a high voltage alternating current potential is utilized for test purposes. This potential is conventionally derived from a step-up transformer whose primary winding is connected to 115 volt commercial power network. The points to be tested are connected either directly or through some form of scanning device to this source. Also connected to the same AC source is a reference network which derives a voltage directly proportional to the test voltage. Also connected to the AC potential source is a circuit arrangement that produces a continual chain of pulses of opposite polarity, in phase with the alternating current voltage source described previously. A sensing resistor is also connected between the AC source and ground and connected to the sensing resistor is a signal alternator.

The signal alternator under control of the pulse train described previously, alternately connects voltage from across the current sensing arrangement to two inputs of a differential amplifier included in the alternator; one input acts to produce a proportional inverted output based on the inphase current signal applied, and the other provides a non-inverted signal. The output of this differential amplifier is connected to one input of another differential amplifier whose remaining input is connected to the original reference potential derived from the AC source. A comparison of the reference potential against that supplied by the signal alternator will provide a decision on a high-low limit basis. Alternately the use of a reference potential and differential amplifier for comparing the output of the alternator is not required. By means of a meter connected directly to the output of the alternator a determination of real current can be made, to provide indications of breakdown conditions as determined by the test device.

DESCRIPTION OF THE PREFERRED EMBODIMENT

Figure 1:
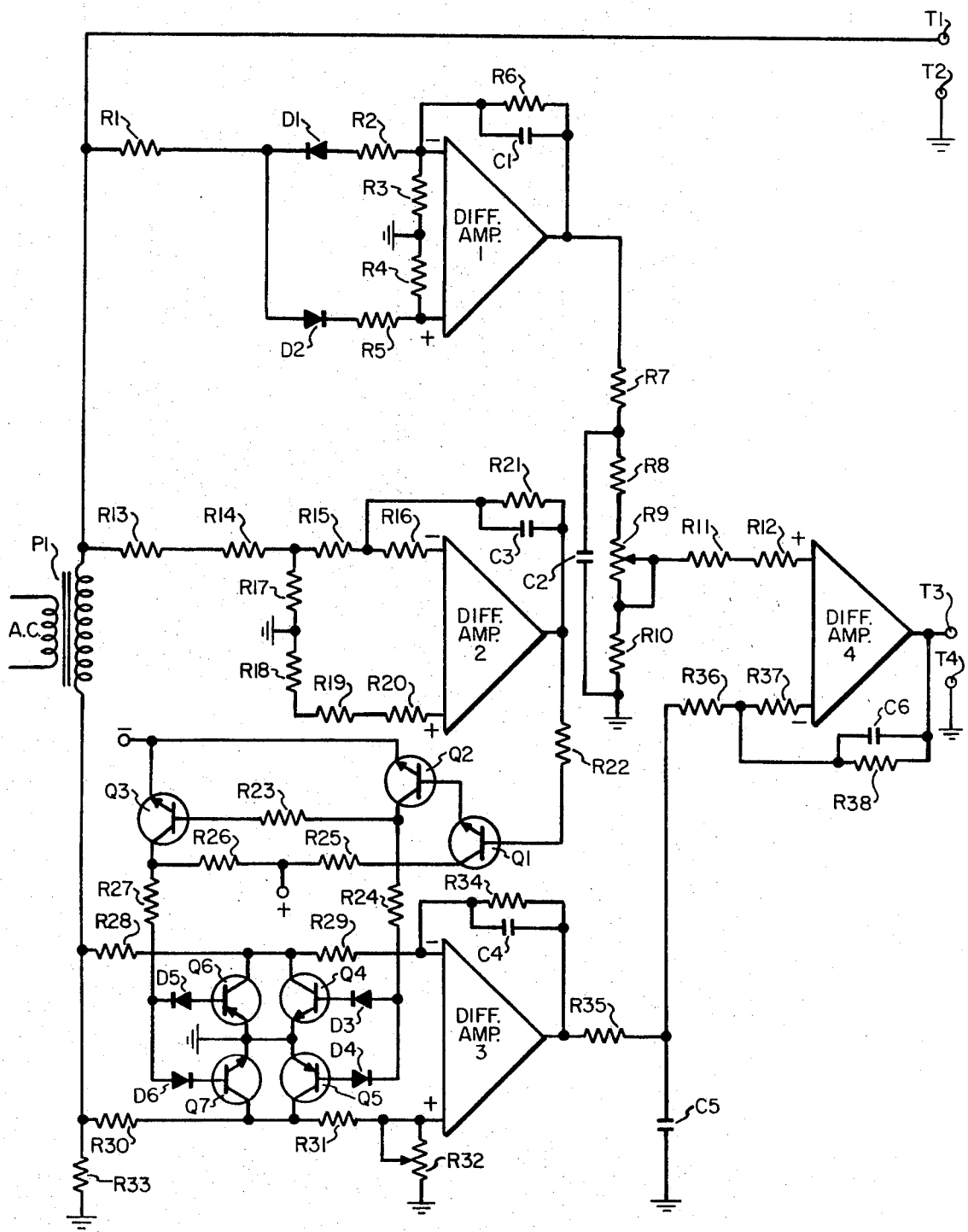
FIG. 1 is a schematic circuit diagram of an alternating current breakdown detector embodying the present invention.

Referring now to FIG. 1 an alternating current insulation breakdown detector is shown embodying the present invention. A description of the apparatus of such a detector and basic understanding of its working will be presented in order to facilitate an understanding of the circuitry that forms the present invention.

The breakdown detector includes a source of test voltage. This may be the output of a transformer whose primary windings are connected to commercial power mains. In at least one embodiment of the present invention the output or secondary of such transformer produces 500 volts A.C. A secondary source of power for the circuitry of the present detector is also required. Such a supply typically will provide potentials of + and − 15 volts D.C. as well as a common or grounded return point. Points for application of the low voltage D.C. required for operating the included electronic circuitry are shown in FIG. 1 by conventional + or − signs. The circuit conductors or components under test are connected to the circuitry of the present invention at the terminals shown in FIG. 1 as T1 and T2. Likewise a meter or similar device to indicate the presence or absence of an insulation breakdown on the conductor or circuit under test, is connected at the terminals designated T3 and T4.

Figure 2:
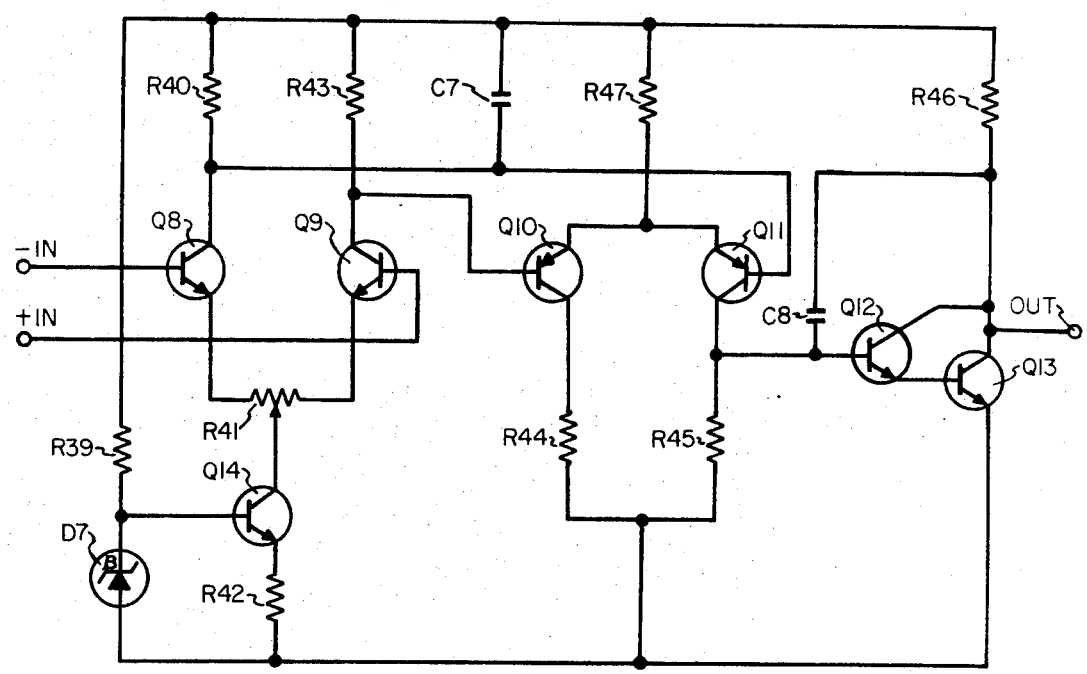
FIG. 2 is a schematic circuit diagram of a differential amplifier utilized at several points in the present invention.

Four differential amplifiers (1, 2, 3 and 4) are employed in the present detector circuitry. The detailed circuitry of these amplifiers is shown in FIG. 2. The circuitry of the amplifiers is conventional and may take the form shown in FIG. 2 or any other arrangement that will be satisfactory to meet the requirements of the present invention. While the circuitry of the differential amplifiers employed in at least one embodiment is shown in FIG. 2, it should not be construed that this arrangement is any way limiting. Such differential amplifiers permit the application of two separate input signals and because of their balanced nature only that portion of one signal which is larger than the portion of the other signal is reproduced as the amplified output of the differential amplifier. Obviously if a signal is applied to one input and not the other amplified version of the applied signal appears at the output.

As shown in FIG. 1 differential amplifier 1 is connected to one side of the secondary winding output of transformer P1. An output voltage from transformer P1 is applied through resistance R1 and diode D1 and resistance R2 to the negative input of differential amplifier 1 and the same signal is applied through diode D2 (which is polarized the reverse of diode D1) and resistance R5 to the positive input of differential amplifier 1. Resistor R3 connected between the negative input and ground and resistor R4 connected between the positive input and ground provide the necessary voltage division to apply the proper level input potential at the amplifier inputs. Because of the presence of diodes D1 and D2 rectified half waves of the input AC signals are alternately produced at the output of differential amplifier 1 and due to the inverting characteristics of the circuitry associated with the positive input of the amplifier the output signals are all of the same polarity. Resistance R6 and C1 provide a measure of negative feedback for differential amplifier 1. From the output of differential amplifier 1 the resulting signal is applied through resistance R7 to a filter network consisting of resistances R8 and R10 potentiometer R9 and capacitor C2. An adjustable output is taken from potentiometer R9 with the resultant waveform (essentially a DC signal) applied, as a reference signal through resistances R11 and R12 to the positive input of differential amplifier 4.

Differential amplifier 2 is connected through resistances R13 and R14 to the same side of the secondary winding of transformer P1 as differential amplifier 1. The A.C. signal at this point is applied through a voltage divider consisting of resistors R15 and R17 and then through resistor R16 to negative input of differential amplifier 2. The positive amplifier portion of differential amplifier 2 is connected through resistances R18, 19 and 20 to ground. Because of the presence of ground on the positive input of differential amplifier 2 alternate half cycles of AC will be amplified by the negative or inverting portion of differential amplifier 2 to form square wave pulses at the output of the amplifier. Negative feedback from differential amplifier 2 is provided by virtue of resistor R21 and capacitor C3. The square wave output of differential amplifier 2 is used as synchronizing pulses for the present detector.

Differential amplifier 3 has associated circuitry consisting of transistors Q1 through Q7, resistors R24 through R32 and diodes D3 through D6 inclusive which comprise a signal alternator or electronically controlled reversing switch. Input signals from the opposite side of the secondary winding of transformer P1 to that previously described are taken from a point between the transformer winding and sensing resistor R33. Signals are applied to the negative input of differential amplifier 3 through resistors R28 and 29 and to the positive input through resistors 30 and 31 and voltage divider R32 to the positive input of differential amplifier 3. Negative feedback is provided by resistor R34 and capacitor C4. The output of differential amplifier 3 is applied through a filter consisting of resistor 35 and capacitor C5 to ground which smooths the output waveform of differential amplifier 3 and then through resistors R36 and R37 to the negative input of differential amplifier 4, where a comparison is made between the reference potential developed by differential amplifier 1 and its associated circuitry and the output signal of differential amplifier 3. The output signal of differential amplifier 4 is applied at terminals T3 and ground terminal T4 to a suitable indicating device. In a practical embodiment of the present invention a signal of +10 volts indicates satisfactory characteristics of the insulation of the circuit error device under test, while a figure of −10 volts indicates an insulation breakdown or failure.

Synchronization of the signal alternator that includes differential amplifier 3 utilizes an output signal taken through resistor R22 from differential amplifier 2. The means in which this signal is utilized to synchronize the alternator and the switching operation of the alternator and its means for sampling output voltages will be described in detail as follows: As noted previously the present alternator is an electronically controlled reversing switch. The signal at the output will be either the same as that at the input or will be the negative inversion of the input signal depending upon whether the control signal (synchronizing signal) is positive or negative. This circuit is capable of reversing signals of frequency from DC to 100 kHz and of the amplitude from 0.1 to 10 volts. It is capable of switching at a rate of 0 to 10,000 times per second.

As noted previously signal inputs are derived from the circuit conductor extending from the secondary of transformer P1 and connected through sensing resistor R33 to ground, and applied through resistors R28 and R29 to the negative input of differential amplifier 3 and through two other similar resistors R30 and R31 to the positive input of differential amplifier 3. Resistor R32 provides voltage division at the positive amplifier input. Transistors Q4 and Q6 act together as a switch to ground the junction of resistors R28 and R29 when the control signal voltage received from differential amplifier 2 is negative. Transistor Q4 conducts when input signal through resistor R28 is positive and transistor Q6 conducts when the input signal is negative, acting together they provide an alternating current path to ground. During the same time that transistors Q4 and Q6 are on and a negative control signal is present from differential amplifier 2 transistors Q5 and Q7 are turned off and appear as an open circuit. Thus signals may be conducted through resistors R30 and R31 to the positive input of differential amplifier 3.

When the control signal from differential amplifier 2 is positive the junction of resistors R30 and 31 is grounded and current signals can be conducted through resistors R28 and R29 to the negative input of differential amplifier 3. Signals applied at the negative input are inverted by virtue of the inverting action of the negative amplifier that constitutes a portion of differential amplifier 3 as discussed previously. This then yields an output which is negative or the inverse of the input signal. During the time that the control signal is negative the junction of R28 and R29 as noted is grounded and signals applied through R30 and R31 to the positive input appear in the same polarity as received at the input, inasmuch as the positive portion of differential amplifier 3 is non-inverting. In the embodiment shown the gain of each portion of differential amplifier 3 is approximately 1.1. The exact gains in the inverting and non-inverting configurations is more or less arbitrary as long as the two gains are equal in magnitude.

The switching transistors Q4 through Q7 inclusive are controlled by virtue of the control signal from differential amplifier 2 applied through an alternating arrangement provided by transistors Q1, Q2 and Q3 and resistors R23 through 27 inclusive. The operation of this control circuit is as follows. When a positive pulse is applied through resistor R22 to the base of transistor Q1, transistor Q1 and transistor Q2 are turned on and provide a negative potential through resistance R24 to the base of transistor Q5, because of the low impedance path established insufficient current is available through resistance R23 to turn transistor Q3 on. Therefore current flows from positive terminal through resistor R26 and resistor R27 and diode D6 to the base of transistor Q7. If a negative signal component is present at the junction of resistors R30 and R31 a path to ground exists through transistor Q5. If a positive signal is present at the same junction a path to ground exists through transistor Q7. Alternately if a negative signal is applied through resistor R22 to the base of transistor Q1, transistors Q1 and Q2 will be turned off causing a positive current flow to extend from the positive battery terminal through resistor R25 and resistor R24 and to the base of transistor Q4 through diode D3 turning it on. When transistors Q1 and Q2 are not on, a positive potential also exists through resistor R23 at the base of transistor Q3 causing it to turn on. With transistor Q3 turned on, a negative signal is applied through resistor R27 and diode D5 to the base of transistor Q6 turning it on. When a positive component of the current signal sampled is available through resistor R28 a path to ground is created through transistor Q4 to ground. If the same signal input produces a negative signal a path through ground exists through transistor Q6.

As is obvious from the preceding when transistors Q5 and Q7 are turned on providing paths to ground for signals at the junction of resistors R30 and R31, signals applied through resistor R28 are extended through resistor R29 to the negative input of differential amplifier 3. Conversely when transistors Q4 and Q6 are turned on providing ground paths for signals at the junction of resistors R28 and R29 a path is provided through resistors R30 and R31 to the positive input of differential amplifier 3.

The arrangement as shown is required inasmuch as reactive components in the circuits under test and variations resulting during the testing procedure, cause a phase shift in the current flowing in the testing circuit that may differ by as much as 90° from the phase of the voltage present. That is to say while the voltage determined synchronizing control signal is positive the current signal which is being sensed may be positive or negative and conversely when the control signal is negative the current input signal may also be negative or positive. This arrangement produces an output voltage from differential amplifier 3 which is proportional to the real (in phase) current flowing through a sensing resistor R33.

In an alternate arrangement voltage across the load may be used for the alternator control input. The signal input then is voltage determined across a sensing resistor and applied to the signal input of the alternator. The alternator then synchronously rectifies the current, gives an output whose average value can be read directly by a meter or similar device. In the present embodiment if the alternator output taken from differential amplifier 3 and filtered by resistor R35 and capacitor C5 is compared to a reference voltage which is proportional to the applied voltage a condition determination can be made. If the alternator output is greater than the reference voltage the output of differential amplifier 4 will be positive indicating a failed condition. If the alternator output is less than the reference, the amplifier output will be negative indicating a pass condition.

What is claimed is:

1. An arrangement for testing breakdown of the insulation between a conductor under test and an adjacent second conductor, said two conductors having a certain amount of stray capacitance therebetween, an alternating current source connectable across said conductors for impressing thereacross an alternating current voltage of a magnitude to place said insulation under breakdown stress whereby alternating current potential is permitted to flow over said two conductors and said stray capacitance in series; apparatus for rendering said breakdown tests substantially independent of said stray capacitance, said apparatus including: sensing means connected between said alternating current source and said second conductor; synchronizing means connected to said alternating current source operated to periodically generate control pulses in response to current reversals of said alternating current source; amplifying means comprising an inverting amplifier and a non-inverting amplifier each having input connections to said current source and said sensing means, said amplifying means further including an output circuit; switching means connected between said synchronizing means and said amplifying means operated in response to said periodic pulses from said synchronizing means to alternately short circuit said inverting amplifier input and said non-inverting amplifier input whereby signals representative of the magnitude of current flowing through said conductors under test are alternately conducted to said inverting amplifier and to said non-inverting amplifier; and magnitude measurement means connected to the output of said amplifier means operated to indicate the magnitude of current flowing over paths between said conductor under test and said adjacent second conductor to indicate the magnitude of leakage condition between said conductors.

2. A test arrangement as claimed in claim 1 wherein is further included reference signal means connected to said source of AC current; and signal comparison means connected to said reference potential means and to the output of said amplifying means, operated to provide a comparative indication between said reference potential and said amplified sample signal.

3. A test arrangement as claimed in claim 1 wherein said synchronizing means comprise a first differential amplifier, and said amplifying means comprise a second differential amplifier.

4. A test arrangement as claimed in claim 2 wherein said reference means include a third differential amplifier, and said comparison means comprise a fourth differential amplifier.

* * * * *

UNITED STATES PATENT OFFICE
CERTIFICATE OF CORRECTION

Patent No. 3,678,376    Dated  July 18, 1972

Inventor(s)  Dale R. Jaster et al.

It is certified that error appears in the above-identified patent and that said Letters Patent are hereby corrected as shown below:

On the cover sheet [73] "GTE Automatic Electric Laboratories, Inc." should read -- GTE Automatic Electric Laboratories Incorporated --.

Signed and sealed this 3rd day of April 1973.

(SEAL)
Attest:

EDWARD M. FLETCHER, JR.  
Attesting Officer

ROBERT GOTTSCHALK  
Commissioner of Patents

FORM PO-1050 (10-69)    USCOMM-DC 60376-P69